United States Patent [19]

Grosjean

[11] Patent Number: 4,883,706
[45] Date of Patent: Nov. 28, 1989

[54] THICK COMPOSITE POLYESTER FILMS

[75] Inventor: Pierre Grosjean, Sainte Foy les Lyon, France

[73] Assignee: Rhone-Poulenc Films, Courbevoie, France

[21] Appl. No.: 137,067

[22] Filed: Dec. 23, 1987

[30] Foreign Application Priority Data

Dec. 23, 1986 [FR] France .................................. 86 18230

[51] Int. Cl.$^4$ .......................... B32B 7/02; B32B 27/08
[52] U.S. Cl. .................................... 428/215; 428/220; 428/332; 428/336; 428/480
[58] Field of Search ............... 428/480, 336, 483, 332, 428/220, 215

[56] References Cited

U.S. PATENT DOCUMENTS

| | | | |
|---|---|---|---|
| 4,476,189 | 10/1984 | Posey et al. | 428/336 |
| 4,525,419 | 6/1985 | Posey et al. | 428/480 X |
| 4,585,687 | 4/1986 | Posey et al. | 428/195 |
| 4,725,483 | 2/1988 | Ishii et al. | 428/480 X |

FOREIGN PATENT DOCUMENTS

| | | | |
|---|---|---|---|
| 0188620 | 7/1986 | European Pat. Off. | 428/343 |
| WO84/02144 | 6/1984 | PCT Int'l Appl. | 428/343 |
| 1507876 | 4/1978 | United Kingdom | 428/480 |

*Primary Examiner*—Thomas J. Herbert
*Attorney, Agent, or Firm*—Burns, Doane, Swecker & Mathis

[57] ABSTRACT

Thick, composite polyester films, well adapted as base films, e.g., for the graphic arts, are comprised of a crystalline or semicrystalline polyester film substrate (A) having a thickness of at least 40 micrometers, said film substrate (A) having a coating, e.g., a coextrudate, of a sulfonated copolyester adhesion primer on at least one of the face surfaces thereof, and said sulfonated copolyester comprising at least 80 mol % of terephthalate recurring units and from 3 to 10 mol % of oxysulfonylate recurring units.

16 Claims, No Drawings

THICK COMPOSITE POLYESTER FILMS

CROSS-REFERENCE TO COMPANION APPLICATION

Copending application Ser. No. 137,160, filed concurrently herewith and assigned to the assignee hereof.

BACKGROUND OF THE INVENTION

1. Field of the Invention

The present invention relates to novel, oriented, thick composite polyester films having a variety of final application coatings improvedly adhered thereto, to a process for the production thereof, and to the final application coated films fabricated therefrom.

As utilized herein, by the term "thick polyester films" are intended films having a thickness greater than 40 micrometers.

2. Description of the Prior Art

It is known to this art that polyester films can be used for many different applications, depending upon their thickness. Thus, the so-called thin films, having a thickness of less than 40 micrometers, are employed as supports for magnetic tapes intended for recording various signals (audio, video and computer signals), or as packaging materials. The so-called thick films, on the other hand, are used as supports for a number of different applications, such as in the graphic arts, mounting supports, masking films or overhead projection films. These films typically receive an application coating which permits their ultimate use. Thus, coatings such as a magnetic film, a printing with an ink, a metal coating, a photosensitive coating and a coating for changing the permeability thereof to gases and/or to water vapor are, for example, deposited onto thin films. Thick films, for their part, are provided with a matte coating intended for drawing, for example a diazo coating. These coatings will hereinafter be referred to by the expression "final application coating".

It is also known to this art that, by nature, the bonding of the final application coatings onto the surface of polyester films is not easy. In fact, polyester films have a relatively smooth surface, limited chemical reactivity, and a very low sensitivity to solvents. Therefore, it is most often necessary to first apply thereto an "adhesion primer" coating of more or less complex chemical formulae, which enables the application coatings to be anchored. In general, this adhesion primer (or anchoring layer) is applied by the individual conducting the conversion. Therefore, it is easy to adapt the nature of the primer to the application ultimately made.

Film manufactures have themselves sought to modify the surface of films by various means. For this purpose, the use of polymers of varied nature as adhesion primers has been proposed. A particularly advantageous class of polymers employed for this purpose consists of copolyesters having a plurality of recurring hydrophilic groups and especially hydroxysulfonyl groups, or their metal salts (free sulfonic acid groups or sulfonic acid salts will hereinafter be referred to by the term "oxysulfonyl group" for convenience). Adhesion primers of this type may be deposited either by coating the support film using a dispersion or an aqueous solution (cf. French Patents Nos. 1,401,581 and 1,602,002; U.S. Pat. No. 4,476,189 and European Patent No. 78,559), or by coextrusion or rolling (cf. Japanese Patent Applications published under Nos. 50/135,086 and 79/153,883). The deposition of an adhesion primer of the oxysulfonyl group-containing copolyester type by coating involves the use of copolyesters having high contents of oxysulfonyl group-containing recurring units such as to make it possible to disperse or to dissolve the sulfonated copolyester in water. The coating process lacks flexibility because it restricts the rang of sulfonated copolyesters which can be employed to those having a high content of oxysulfonyl group-containing recurring units. Moreover, depending on their composition, such sulfonated copolyesters may have low bonding temperatures which make the composite films difficult to handle or to use.

Coextrusion is an advantageous process for applying an adhesion primer coating. The improvement in suitability for printing and the adhesiveness to metal coatings of thin crystalline or semicrystalline polyester films by depositing a sulfonated copolyester-based anchoring layer by coextrusion has been proposed in Japanese Patent Application published under No. 79/153,883. To this end, copolyesters containing from 0.5 to 50 mol % and preferably from 1 to 20 mol % of oxysulfonyl group-containing recurring units relative to recurring units of the same nature are employed. The copolyesters employed are, more particularly, polycondensates containing a plurality of terephthalate and 5 sulfoisophthalate recurring units. It was observed that the improvement in adhesiveness of crystalline or semicrystalline polyester films to their final application coatings meets different demands according to their thickness. In general, because of the nature of their final coating, thick films require sulfonated copolyesters having a higher content of oxysulfonyl group-containing recurring units than thin films; in general, the sulfonated copolyesters employed for thick films must contain more than 3 mol % of sulfonated recurring units relative to recurring units of the same nature. However, coextrusion proves to be industrially unsuitable for the production of oriented composite polyester films containing, on at least one of their face surfaces, an adhesion primer coating based on a sulfonated copolyester having a high content of sulfonated recurring units. Thus, it was observed that sulfonated copolyesters of the ethylene glycol terephthalate/5-sulfoisophthalate type having a high content of 5-sulfoisophthalate units, for example greater than or equal to 10 mol %, do not easily lend themselves to the production of composite films by coextrusion. Their use entails a lengthy and expensive drying step because of hygroscopicity; an insufficient drying interferes with the progress of the coextrusion process and results in poor quality films. Additionally, the theological properties of sulfonated copolyesters are greatly modified by the presence of recurring units containing oxysulfonyl groups and are different from those of the polyester employed for producing the support film. This difference in rheological properties of the two polycondensates complicates the production of a composite film by coextrusion, or even makes it impossible. To summarize, the manufacturer of thick, oriented, crystalline or semicrystalline polyester films must compromise between two opposing requirements: improving the adhesiveness of thick films to their final application coatings by using sulfonated copolyesters, but without interfering with the coextrusion conditions. These two requirements cannot be satisfied by the use of any sulfonated copolyester of the prior art.

SUMMARY OF THE INVENTION

Accordingly, a major object of the present invention is the provision of improved composite, thick crystalline or semicrystalline polyester films having final application coatings more adhesively bonded thereto via particular sulfonated copolyester-based adhesion primer coating.

A second object of the present invention is the provision of such thick composite polyester films having improved adhesiveness, by coextrusion.

A third object of this invention is the provision of improved thick composite polyester films comprising at least one sulfonated copolyester-based adhesion primer coating.

Briefly, the present invention features the production of composite polyester films having improved adhesiveness towards a variety of final application coatings, the same comprising a crystalline or semicrystalline polyester support film (A) having a thickness greater than 40 micrometers, and bearing on at least one of its face surfaces a contiguous layer (B) of a sulfonated copolyester-based adhesion primer coating, by the coextrusion of a crystallizable polyester and an oxysulfonyl group-containing copolyester, cooling of the composite thus obtained, drawing it in at least one direction and then thermosetting the composite. The sulfonated copolyester contains at least 80 mol % of terephthalate recurring units relative to the total number of the recurring units derived from non-sulfonated diacids and from 3 to 10 mol % of oxysulfonyl group-containing recurring units relative to the total number of recurring units of like nature.

The novel oriented composite polyester films thus produced have improved adhesiveness towards their final application coatings, and comprise a crystalline or semicrystalline support film (A) having thickness greater than 40 micrometers, bearing on at least one of its face surfaces a contiguous and coextensive layer (B) of a sulfonated copolyester-based adhesion primer coating, and wherein such sulfonated copolyester defining the layer (B) contains at least 80 mol % of terephthalate recurring units relative to the total number of recurring units derived from non-sulfonated diacids and from 3 to 10 mol % of oxysulfonyl group-containing recurring units relative to the total number of the recurring units of like nature.

DETAILED DESCRIPTION OF THE PREFERRED EMBODIMENTS OF THE INVENTION

More particularly according to the present invention, by the term "crystallizable polyester" are intended polyesters or copolyesters which, after extrusion in the molten state through a die, followed by the drawing of the amorphous polymer, yield crystalline or semicrystalline polyesters or copolyesters. The crystallinity of the polymers is determined by usual methods which are well known to this art, such as X-ray diffraction, differential thermal analysis [cf. S. H. LIN et al., *J. Polymer Sci. Polymer Symposium*, 71, 121-135 (1984)]and density test.

The crystallizable polyesters employed for the preparation of the support layer (A) are the polyesters and copolyesters which are typically used for the production of oriented polyester film by drawing and which have a crystalline or semicrystalline structure after drawing.

For this purpose, it is possible to use any film-forming polyester produced from one or more carboxylic diacid(s) or their lower alkyl esters (terephthalic acid, isophthalic acid, 2,5-naphthalenedicarboxylic acid, 2,6-naphthalenedicarboxylic acid, 2,7-naphthalenedicarboxylic acid, succinic acid, sebacic acid, adipic acid, azelaic acid, diphenyldicarboxylic acid and hexahydroterephthalic acid) and one or more diols or polyhydric alcohols, such as ethylene glycol, 1,3-propanediol, 1,4-butanediol, neopentylglycol and 1,4-cyclohexanedimethanol, and polyoxyalkylene glycol (polyoxyethylene glycol, polyoxypropylene glycol, or their random or block copolymers). When copolymers are employed, they must have a sufficient content of monomeric component(s) which impart crystallinity. Homopolyesters or copolyesters derived from terephthalic acid are preferably employed. In the case of copolyesters, the latter preferably have a terephthalate unit content representing at least 80 mol % of the diacid units and more preferably at least 90%. Polyesters and copolyesters derived from ethylene glycol and from 1,4-butanediol constitute a preferred class of polymers employed for the production of the support layer (A). The polyester is advantageously an ethylene glycol polyterephthalate having an intrinsic viscosity, as determined at 25° C. in o-chlorophenol, of from 0.6 to 0.75 dl/g.

Representative of the oxysulfonyl group-containing copolyesters forming the layer (B), copolyesters containing terephthalate units having a plurality of groups of the following general formula are employed:

in which:
n is equal to 1 or 2;
M represents a hydrogen atom, an alkali metal (for example sodium or potassium), an alkaline earth metal (calcium or barium), an ammonium cation or a quaternary ammonium cation.

The oxysulfonyl group-containing copolyesters are known polymers. Such copolyesters have been described in the French Pat. Nos. 1,401,581 and 1,602,002. These copolyesters may be produced by the polycondensation of one or more aromatic dicarboxylic acids with one or more aliphatic diols and at least one bifunctional comonomer containing at least one oxysulfonyl group. The oxysulfonyl group-containing bifunctional comonomers may be carboxylic diacids or diols, such as those described in French Pat. No. 1,602,002 or U.S. Pat. No. 3,779,993. The oxysulfonyl groups are preferably linked to an aromatic radical.

Among these oxysulfonyl group-containing bifunctional comonomers, aromatic acids of the following general formula are the more preferred:

in which:
M and n are as defined above;
Z is a polyvalent aromatic radical;
X and Y are hydroxycarbonyl radicals or derivatives thereof: lower aliphatic alcohol esters or acid halides (chloride or bromide); and
p is an integer equal to 1 or 2.

In the formula (II), Z more preferably represents a phenyl radical or a combination of 2 or more than 2 ortho- or peri-fused phenyl radicals or of two or more phenyl groups linked to one another via inert groups such as alkylene (for example methylene, ethylene or propylene) or alkylidene (propylidene) radicals, or ether, ketone or sulfone groups.

As specific examples of the oxysulfonyl group-containing dicarboxylic acids, representative are hydroxysulfonylterephthalic acids; hydroxysulfonylisophthalic acids (especially 5-sulfoisophthalic acid); hydroxysulfonylorthophthalic acids; 4-hydroxysulfonyl-2,7-naphthalenedicarboxylic acid; hydroxysulfonyl-4,4'-biphenyldicarboxylic acid; hydroxysulfonyl-4,4'(dihydroxycarbonyl)diphenyl sulfones; hydroxysulfonyl-4,4'-(dihydroxycarbonyl)diphenylmethanes; 5-(hydroxysulfonylphenoxy)-isophthalic acid and 5-(hydroxysulfonylpropoxy)isophthalic acid. The sulfonated copolyesters derived from hydroxysulfonylisophthalic acids are very particularly well suited for the preparation of the composite films according to the invention.

The nonsulfonated dicarboxylic acids which can be combined with terephthalic acid in order to prepare the oxysulfonyl group-containing copolyesters are those which are typically used for the production of polyesters. As examples of these, representative are isophthalic, phthalic, 2,5-naphthalenedicarboxylic and 2,6-naphthalenedicarboxylic acids; 4,4'-(dihydroxycarbonyl)diphenyl sulfone; 4,4'-(dihydroxycarbonyl)diphenyl ether; and alkanedioic acids containing from 4 to 16 carbon atoms, such as adipic, succinic and sebacic acids. These acids may be employed alone or as mixtures with one another. Isophthalic acid is preferably used.

Among the diols which can be employed for preparing the oxysulfonyl group-containing copolyesters, exemplary are ethylene glycol, propylene glycol, 1,3-butanediol, 1,4-butanediol, 2,2-dimethyl-1,3-propanediol, 1,5-pentanediol, 1,6-hexanediol, cyclohexanedimethanol, neopentylglycol, diethylene glycol and tri-, tetra-, penta- and hexaethylene glycols. Ethylene glycol and its oligomers are very particularly well suited. They may be employed alone or as mixtures with one another and/or with other diols. Mixtures of ethylene glycol and its oligomers having a molecular weight less than 600 are preferred. In the latter case, the ethylene glycol oligomer content, expressed as a percentage by weight of the sulfonated polyester, is preferably at least equal to 2% and at most equal to 30%. A proportion of from 3 to 15% by weight is preferred.

As mentioned above, the content of the recurring units containing oxysulfonyl groups in the sulfonated copolyesters, expressed relative to the total number of recurring units of the same nature (diacid or diol), ranges from 3 to 10%. Thus, when an oxysulfonyl group-containing dicarboxylic acid is employed, the number of recurring units derived from the latter constitutes from 3 to 10% of the total number of recurring units derived from the different dicarboxylic acids.

Among the oxysulfonyl group-containing copolyesters, those containing in their chain a plurality of terephthalate, 5-oxysulfonyl isophthalate and optionally isophthalate units and a plurality of units derived from ethylene glycol and/or its oligomers are preferably used. Copolyesters in which the number of 5-oxysulfonylisophthalate recurring units represents from 3 to 10% of the total number of units derived from dicarboxylic acids are advantageously employed. When the copolyesters contain both terephthalate and isophthalate units, the latter preferably represent at most 20% of the total terephthalate/isophthalate units. A number of isophthalate units of from 5 to 10% of this total is well suited.

The sulfonated copolyesters described above may be prepared by conventional known methods. Thus, it is possible to react, in a first stage, the diol or the diols with a methyl ester of the carboxylic acid or acids, one or the other group of reagents containing the oxysulfonyl group-containing bifunctional compound, to form by transesterification, in the presence of the usual catalysts, the corresponding diol esters and then, in a second stage, to carry out a polycondensation in known manner. According to another method, it is possible to prepare two prepolycondensates, one of which contains the oxysulfonyl group-containing recurring units, and to react them in the presence of common catalysts until a high molecular weight copolyester is produced. The oxysulfonyl group-containing copolyester may be a block copolyester or a random copolyester.

The layers (A) and/or (B) of the composite films of the invention may contain fine particles intended to modify the surface roughness of the layer in which they are incorporated, by imparting good slip properties thereto.

The fillers present may be fine particles introduced into the polymeric composition and/or particles originating from catalytic residues or from precipitation adjuvants. The roughness is preferably imparted by introducing fine inert particles into the polymeric composition.

The amounts of particles present are such that the particle content of the entire layer is from 0.05 to 1% and preferably from 0.02 to 0.5% by weight. With regard to the volume-median diameter of these particles, this typically ranges from 0.1 to 5 microns and preferably from 0.2 to 3 microns.

The nature of the inert particles added may be very diverse: these may be inorganic particles (oxides or salts of elements of Groups II, III and IV of the Periodic Table) or, alternatively, polymeric particles. Among such fillers, representative are, by way of illustration, silica, silicoaluminates, calcium carbonate, MgO, $Al_2O_3$, $BaSO_4$ and $TiO_2$. A mixture of several fillers may obviously be employed.

In one embodiment of the present invention, the layers (A) and/or (B) may additionally contain various additives which are commonly employed in the film industry, such as, for example, heat stabilizers which enable the film to be recycled.

The composite films according to the present invention may contain a single layer (B) or two layers (B) (a layer B on each face surface of the support layer A). In this case, the layers (B) may be identical or different. The layers (B) may then differ from each other in the nature of the sulfonated polyesters and/or the presence or the absence of fillers, and/or by the filler content and/or also in their thicknesses.

When the composite films according to the invention have only a single layer (B), the other face surface of the layer (A) may bear a layer (C) other than layers (A) and (B). The layer (C) may differ from layer (A) in the nature of the polyester comprising same and/or in the presence of fillers in one or the other layer and/or in the nature and/or the particle size and/or the content of these fillers. A convenient means is thus provided for modifying the surface properties (topography) to the face surface of the composite film according to the invention opposite to that onto which the layer (B) is coated. It is then possible to vary the roughness, the coefficient of friction and scratch resistance depending on the final use of the films.

According to the present invention, the thick films having improved adhesiveness are produced by coextrusion. To this end, a polyester which provides an amorphous film and which becomes crystalline or semicrystalline after being subjected to a drawing operation followed by a thermosetting treatment is charged into a first linear die, whereas the sulfonated copolyester is simultaneously extruded in the form of at least one second film (B) deposited onto at least one of the two face surfaces of the amorphous film (A), using at least one second die arranged parallel to the first and in its immediate vicinity. The composite film thus produced is then cooled in a manner known per se, drawn in order to induce orientation and crystallization of the polyester defining the film (A), and is then thermoset.

The conditions for drawing the extruded composite film are those typically employed in the manufacture of polyester films. Thus, it is possible to conduct a monoaxial drawing, or a biaxial drawing carried out successively or simultaneously in two directions, generally orthogonal, or alternatively, sequences of at least 3 drawings in which the drawing direction is changed in each sequence. Moreover, each unidirectional drawing itself may be carried out in several stages. It will thus be possible to combine drawing sequences such as, for example, two successive biaxial drawing treatments, it being possible for each drawing to be carried out in several stages.

The composite film is preferably subjected to a biaxial drawing in two perpendicular directions. For example, it is possible to conduct a first drawing in the direction of movement of the film (longitudinal drawing) and then a drawing along a perpendicular (transverse drawing) direction, or vice versa. The longitudinal drawing is generally carried out to an extent of from 3 to 5 (i.e., the length of the film drawn represents from 3 to 5 times the length of the amorphous film) and at a temperature from 80° to 100° C. and the transverse drawing is carried out to an extent of from 3 to 5 at a temperature from 90° to 100° C.

The drawing may also be carried out simultaneously, i.e., simultaneously in the longitudinal direction and in the transverse direction, for example, to an extent of from 3 to 5 and at a temperature from 80° to 100° C.

Depending on the choice of drawing conditions, it is possible to produce specific surface topographies such as the presence of cavities surrounding a protuberance. This possibility of producing particular topographies additionally depends on the choice of the polymer and its adjuvants.

The composite films of the invention are thick films having thickness greater than 40 micrometers and less than 300 micrometers. In these composite films, the layer (B) or the layers (B) have a thickness usually from 0.3 micrometers to 10 micrometers and preferably from 0.5 micrometers to 5 micrometers.

In consideration of their anchoring properties the composite films of the present invention may advantageously be employed in many fields as, after coating, films for the graphic arts (matte coating), for example, diazo films for microfilms.

In order to further illustrate the present invention and the advantages thereof, the following specific examples are given, it being understood that same are intended only as illustrative and in nowise limitative.

In said examples to follow, the crystalline or crystallizable polyesters will be denoted by (a) and the sulfonated copolyesters by (b). The below tests for adhesiveness will be employed:

Each composite film is coated on its layer (B) with a final coating applied manually using an apparatus bearing the trademark HAND COATER TM, the engraved coating rod of which is selected such as to deposit 6 g of composition per m$^2$ of film. The coated film is dried in a fan-assisted oven for 1 minute at 150° C. and stored for 24 hours before being subjected to the following adhesiveness tests.

Peeling tests for the coating are carried out on each of the coated films using an adhesive tape bearing the trademark MAGIC TAPE TM No. 810 and marketed by MINNESOTA MINING & MANUFACTURING. The tape is placed manually and peeled under conditions of increasing severity:

(a) slow peeling;
(b) quick peeling;
(c) peeling with prior scarring of the final coating with a razor blade;
(d) peeling with prior creasing of the film.

In each case, the resistance to peeling is rated from 1 (easy complete peeling) to 10 (perfect retention of the coating). Finally, an overall rating from 1 to 10 which takes into account the ratings given for each of the conditions (a) to (d), provides a general evaluation of resistance to peeling of the final coatings in each of the tests.

The following tests were employed:

Test 8

A matte coating for the graphic arts, based on polyvinyl alcohol crosslinked in the heated state, in a water:alcohol solvent, is applied to the composite film.

Test 10

An uncrosslinked cellulose acetopropionate-based diazo matte coating dissolved in alcohol is applied.

Test 3

A diazo coating for microfilm reproduction, in a ketone medium, is applied to the composite film.

In the examples below, the following polyesters and copolyesters were employed:

(1) Crystallizable polyesters (a):

Reference (a1):

This was an ethylene glycol polyterephthalate containing 3.8 mol % of diethylene glycol and having a viscosity index of 740 as determined at 25° C. in orthochlorophenol.

(2) Sulfonated polyesters (b):

Reference (b1):

This copolyester was prepared as follows:

According to known processes, a prepolycondensate was first prepared by the reaction between isophthalic acid, 5-sulfoisophthalic acid and ethylene glycol in the presence of sodium acetate which is employed as catalyst; the esterification was carried out at atmospheric pressure up to 220° C. followed by prepolymerization up to 240° C.

Another prepolycondensate was also prepared from dimethyl terephthalate and ethylene glycol in the presence of manganese acetate; the interchange was continued under atmospheric pressure up to 225° C. After adding a phosphorus-containing stabilizer and antimony trioxide, this prepolycondensate was mixed with the prepolycondensate described in the preceding paragraph; the mixture was heated to 275° C., the pressure being gradually reduced to 0.5 torr.

The copolyester obtained was then cast and granulated. It had the following characteristics:
isophthalic acid content in the terephthalic acid (TA)/isophthalic acid (IA) mixture: 15 mol %;
5-sulfoisophthalic acid content (SIA) in moles per 100 moles of non-sulfonated aromatic diacids (TA/IA): 3.5%;
diethylene glycol (DEG) content by weight: 9%

Reference (b2) to (b5):

Following the above procedure, various sulfonated copolyesters having TA/IA/SIA/ethylene glycol-/ethylene glycol oligomer recurring units having the following characteristics were prepared:

| Reference for sulfonated copolyester | TA in mol % | IA in mol % | SIA in mol % | DEG % by weight |
|---|---|---|---|---|
| b2 | 90 | 10 | 7 | 4.1 |
| b3 | 95 | 5 | 3.5 | 1.7 |
| b4 | 40 | 60 | 14 | 14 |
| b5 | 100 | 0 | 14 | 14 |

The composite films were prepared by coextrusion of a film of polyester (a) and copolyester (b). The main extrusion line for layer (A) wa operated at 275° C. and the satellite extrusion line for layer (B) at a temperature below 275° C.

Before extrusion, the copolyester (b) were ovendried under moisture-free air, and then stored and charged, under an inert gas atmosphere, into the screw-type extruder of the satellite extrusion line.

EXAMPLE 1

A biaxially drawn composite film F1 containing three layers B/A/B was prepared by coextruding, on the one hand, the polyterephthalate (a1) described above and the sulfonated copolyester (b1). The layers (B) on either side of layer (A) were identical and had a thickness of 1.5 micrometer. The total thickness of the film F1 was 50 micrometers. It was subjected to the adhesiveness tests described above. The following results were obtained:
Test 3: overall rating: 10
Test 8: overall rating: 10
Test 10: overall rating: 8

EXAMPLES 2 to 3

Following the procedure of Example 1, two composite films F2 and F3, 50 micrometers in thickness, were prepared after replacing the sulfonated copolyester (b1) by the copolyesters (b2) and (b3), all other parameters being equal. The following results were obtained in the adhesiveness test:

| Reference for films | Test 3 | Test 8 | Test 10 |
|---|---|---|---|
| F2 | 10 | 9 | 10 |
| F3 | — | 10 | 3 |

By way of comparison, attempts were made to produce composite films by extruding polyester a1 and copolyesters b4 and b5 which were not in accordance with the invention. The films could not be produced.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A coextruded composite polyester film having a thickness greater than 40 micrometers, comprising a thick crystalline or semicrystalline polyester film substrate (A), said film substrate (A) having a coating (B) of a sulfonated copolyester adhesion primer on at least one of the face surfaces thereof, said sulfonated copolyester comprising at least 80 mol % of terephthalate recurring units and from 3 to 10 mol % of oxysulfonylated recurring units.

2. The composite polyester film as defined by claim 1, said coating(s) (B) having a thickness ranging from 0.3 to 10 micrometers.

3. The composite polyester film as defined by claim 1, wherein the sulfonated copolyester comprising said coating (B) has a plurality of recurring oxysulfonyl groups of the general formula:

$$(-SO_3)_n M \qquad (I)$$

in which n is equal to 1 or 2; and M is a hydrogen atom, an alkali metal, an alkaline earth metal, an ammonium cation or a quaternary ammonium cation.

4. The composite polyester film as defined by claim 1, the film substrate (A) having a coating (B) on each face surface thereof.

5. The composite polyester film as defined by claim 1, at least one of the film substrate (A) and coating(s) (B) comprising an effective amount of filler particles.

6. The composite polyester film as defined by claim 1, wherein the polyester comprising said substrate (A) is a homopolyester or a copolyester of terephthalic acid containing at least 80 mol % of recurring terephthalate units.

7. The composite polyester film as defined by claim 6, wherein the polyester comprising said substrate (A) is ethylene glycol polyterephthalate.

8. The composite polyester film as defined by claim 1, wherein the sulfonated copolyester comprising said coating (B) has a plurality of aromatic diacid recurring units of the formula:

in which n is equal to 1 or 2; M is a hydrogen atom, an alkali metal, an alkaline earth metal, an ammonium cation or a quaternary ammonium cation; Z is a polyvalent aromatic radical; X and Y are hydroxycarbonyl radicals or derivatives thereof; and p is an integer equal to 1 or 2.

9. The composite polyester film as defined by claim 8, wherein the sulfonated copolyester comprises a plurality of recurring units derived from a hydroxysulfonylisophthalic acid.

10. The composite polyester film as defined by claim 8, wherein the sulfonated copolyester comprises a plurality of recurring units derived from isophthalic acid.

11. The composite polyester film as defined by claim 10, wherein the sulfonated copolyester, the number of recurring units derived from isophthalic acid constitutes up to 20% of the total number of terephthalate/isophthalate recurring units.

12. The composite polyester film as defined by claim 8, wherein the sulfonated copolyester comprises a plurality of recurring units derived from ethylene glycol and/or the oligomers thereof having a molecular weight less than 600.

13. The composite polyester film as defined by claim 12, wherein the content by weight of recurring units derived from ethylene glycol oligomers in the sulfonated copolyester ranges from 2 to 30%.

14. The composite polyester film as defined by claim 1, further comprising a final application coating on the at least one primer coating (B).

15. The composite polyester film as defined by claim 14, said final application coating comprising a matte layer.

16. The composite polyester film as defined by claim 14, said final application coating comprising a diazo layer.

* * * * *